(12) United States Patent
Woodruff

(10) Patent No.: US 9,378,666 B1
(45) Date of Patent: Jun. 28, 2016

(54) FLAG HOLDER

(71) Applicant: Keith A. Woodruff, Madison, WI (US)

(72) Inventor: Keith A. Woodruff, Madison, WI (US)

( * ) Notice: Subject to any disclaimer, the term of this patent is extended or adjusted under 35 U.S.C. 154(b) by 0 days.

(21) Appl. No.: 14/573,073

(22) Filed: Dec. 17, 2014

Related U.S. Application Data

(60) Provisional application No. 61/921,750, filed on Dec. 30, 2013.

(51) Int. Cl.
*G09F 17/00* (2006.01)
*F16M 13/02* (2006.01)
*F16B 7/04* (2006.01)
*E04H 12/32* (2006.01)
*F16B 2/22* (2006.01)
*G09F 7/18* (2006.01)

(52) U.S. Cl.
CPC ............... *G09F 17/00* (2013.01); *E04H 12/32* (2013.01); *F16B 2/22* (2013.01); *F16B 7/0486* (2013.01); *F16M 13/022* (2013.01); *G09F 2007/1804* (2013.01); *G09F 2007/1808* (2013.01); *G09F 2007/1813* (2013.01); *G09F 2007/1817* (2013.01); *G09F 2017/0058* (2013.01)

(58) Field of Classification Search
CPC ... E04H 12/32; F16B 2/22; G09F 2007/1808; G09F 2007/1813; G09F 2007/1817; G09F 2007/1804; G09F 17/00
USPC .............................................. 248/536, 218.4
See application file for complete search history.

(56) References Cited

U.S. PATENT DOCUMENTS

| 1,535,396 | A |   | 4/1925  | Buehler       |         |
|-----------|---|---|---------|---------------|---------|
| 1,551,719 | A | * | 9/1925  | Williams      | 248/512 |
| 1,575,614 | A | * | 3/1926  | Blaw          | 248/512 |
| 1,677,379 | A |   | 7/1926  | Ames          |         |
| 1,648,220 | A | * | 11/1927 | Gerow et al.  | 248/541 |
| 1,788,157 | A | * | 1/1931  | Hogan         | 248/541 |
| 2,933,165 | A | * | 4/1960  | Rose          | 52/149  |
| 3,164,343 | A | * | 1/1965  | Cucullo       | 248/27.8 |
| 3,468,428 | A | * | 9/1969  | Reibold       | 211/144 |
| 3,778,537 | A | * | 12/1973 | Miller        | 174/138 R |
| 3,950,874 | A |   | 4/1976  | Diggs         |         |
| 4,469,302 | A | * | 9/1984  | Stoudt        | 248/512 |
| 4,593,877 | A |   | 6/1986  | van der Wyk   |         |
| 5,098,051 | A | * | 3/1992  | Aldridge et al. | 248/230.9 |

(Continued)

FOREIGN PATENT DOCUMENTS

| FR | 2959523 A1 | * | 11/2011 |            |
|----|------------|---|---------|------------|
| FR | DE 202014008285 | * | 11/2014 | B60R 16/0215 |

(Continued)

*Primary Examiner* — Eret McNichols
(74) *Attorney, Agent, or Firm* — Charles S. Sara, Esq.; DeWitt Ross & Stevens SC

(57) ABSTRACT

A flag holder designed to be mounted on a post is made of a collar adapted to hold at least one and preferably several dowels. The collar includes a center arm and two substantially parallel side arms connected to the center arm in substantially perpendicular format to form a shaped band for encircling a post. The collar also includes a pair of gripping ears extending inwardly from the second ends of the parallel side arms. Thus, the collar surrounds a central cavity for receiving the post. The collar further includes at least one dowel and preferably more channel forms on the outer surface of the collar, wherein the dowel channel forms include at least one dowel channel for receiving a dowel holding a flag.

16 Claims, 3 Drawing Sheets

(56) References Cited

U.S. PATENT DOCUMENTS

| | | | |
|---|---|---|---|
| 5,377,944 A | | 1/1995 | Getsinger |
| 5,452,743 A | * | 9/1995 | Rortvedt .................. 137/615 |
| 5,702,081 A | | 12/1997 | Gallemore, II |
| 6,547,197 B2 | | 4/2003 | Kempf et al. |
| 6,663,069 B1 | * | 12/2003 | Norberg .................. 248/316.7 |
| 6,799,744 B1 | * | 10/2004 | Koistinen ................. 248/227.3 |
| 7,621,486 B1 | * | 11/2009 | Barrepski ..................... 248/65 |
| 2003/0168560 A1 | * | 9/2003 | Chipka ..................... 248/218.4 |
| 2005/0247837 A1 | * | 11/2005 | Spencer .................... 248/218.4 |
| 2010/0193655 A1 | * | 8/2010 | Fleischman ............... 248/316.7 |
| 2013/0333197 A1 | * | 12/2013 | Schulte et al. ............. 29/525.08 |
| 2013/0335897 A1 | * | 12/2013 | Mochizuki et al. ...... 361/679.01 |

FOREIGN PATENT DOCUMENTS

| | | | | |
|---|---|---|---|---|
| WO | WO 2009035424 A1 | * | 3/2009 | ............ G09F 17/00 |
| WO | WO 2012162453 A2 | * | 11/2012 | |

\* cited by examiner

FLAG HOLDER

CROSS-REFERENCE TO RELATED APPLICATION

The application claims priority to U.S. Provisional Application entitled "FLAG HOLDER," Ser. No. 61/921,750, filed Dec. 30, 2014, which is incorporated herein by reference in its entirety.

FIELD OF THE INVENTION

The present invention relates to a mounted holder for rods, dowels and the like, and specifically a flag holder for mounting to a post, such as a 4 inch by 4 inch (4×4) post or the like.

BACKGROUND

It has become a symbol of national pride to display flags and other banners in prominent spots, such as a mailbox, flag pole or the like. Prior art systems do exist to display flags by attaching a flag-holder base to the side of the wall, a post or a tree. Typically, such bases are attached by means of screws or nails.

It is often desirable to mount a flag holder on a post without the need for nails or screws which can damage the post. Such a device is illustrated in U.S. Pat. No. 5,377,944 to Getsinger, which discloses a sleeve with pockets for receiving flag poles. This embodiment enables a sleeve to be slipped over the top of the post. The walls are intended to resiliently flex to frictionally hold the sleeve onto the sides of the post in a jaw-like manner, without the need to modify the post. Unfortunately, such a device requires a post without any blocking device on the end, such as a mailbox, finial, cap cover or the like to enable the sleeve to slip on to the post.

SUMMARY OF THE INVENTION

The present invention is directed to a flag holder that is mounted on a post, such as a 4×4 post (or the like) and that is constructed to provide a pressure or squeeze fit to the post in order to releasably attach the holder to post. The flag holder includes channels to receive dowels or other cylindrical objects, such as a flag pole.

More particularly, the present invention is directed to a mounting bracket adapted to be secured to a post, the mounting bracket comprising a collar adapted to hold at least one dowel The collar comprises a center arm having a first and second end, and two substantially parallel side arms having first and second ends, wherein the first ends of the side arms are connected to the first and second ends of the center arm in substantially perpendicular format to form a shaped band for encircling a post. The collar is also defined by a first top surface, a second lower surface, a third outer surface and a fourth inner surface and a pair of gripping ears extending inwardly from the second ends of the parallel side arms, wherein the center arm, parallel side arms and gripping ears extend around a central cavity and wherein the gripping ears extend to an opening therebetween. The present invention further includes at least one dowel channel form on the third outer surface of the collar, wherein the dowel channel form includes at least one dowel channel for receiving a dowel.

The invention is also directed to a mounting bracket adapted to be secured to a post, the mounting bracket comprising a collar adapted to hold at least one dowel. The collar comprises a center arm having a first and second end, and two substantially parallel side arms having first and second ends, wherein the first ends of the side arms are connected to the first and second ends of the center arm in substantially perpendicular format to form a shaped band for encircling a post, wherein finger grips positioned on the parallel side arms to assist in separating the side arms, and wherein the side arms include a memory-enhanced inward angle to create a friction fit on a post, and a first top surface, a second lower surface, a third outer surface and a fourth inner surface. The invention further includes a pair of gripping ears extending inwardly from the second ends of the parallel side arms, wherein the center arm, parallel side arms and gripping ears extend around a central cavity and wherein the gripping ears extend to an opening therebetween. The present invention further includes at least one dowel channel form on the third outer surface of the collar, wherein the dowel channel form includes at least one dowel channel for receiving a dowel.

The present invention illustrates an easy, quick and efficient manner in which to attach and display a flag or other item attached to a small pole such as a wooden dowel rod, on a post, such as a 4×4 post, typically used for a mailbox stand. Advantageously, the flag holder of the present invention requires no drilling of holes in the post to result in uneven or poorly angled holes. In addition and most advantageously, the flag holder of the present invention can be fitted on the post without the requirement of having it slipped over the end of a post, which is required by, for example, U.S. Pat. No. 5,377, 944. Further, staples or nails are not required to hold the flag holder or a dowel rod to the post.

The objects and advantages of the invention will appear more fully from the following detailed description of the preferred embodiment of the invention made in conjunction with the accompanying drawings.

DETAILED DESCRIPTION OF THE INVENTION

Figure 1:
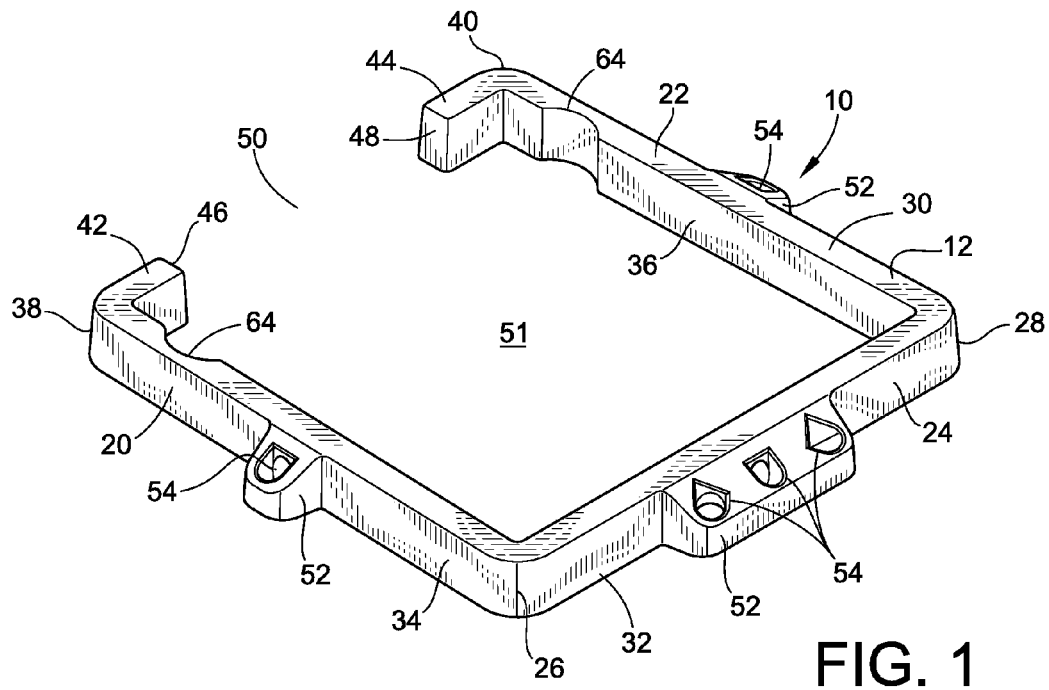
FIG. 1 is a perspective view of the flag holder of the present invention.
Figure 2:
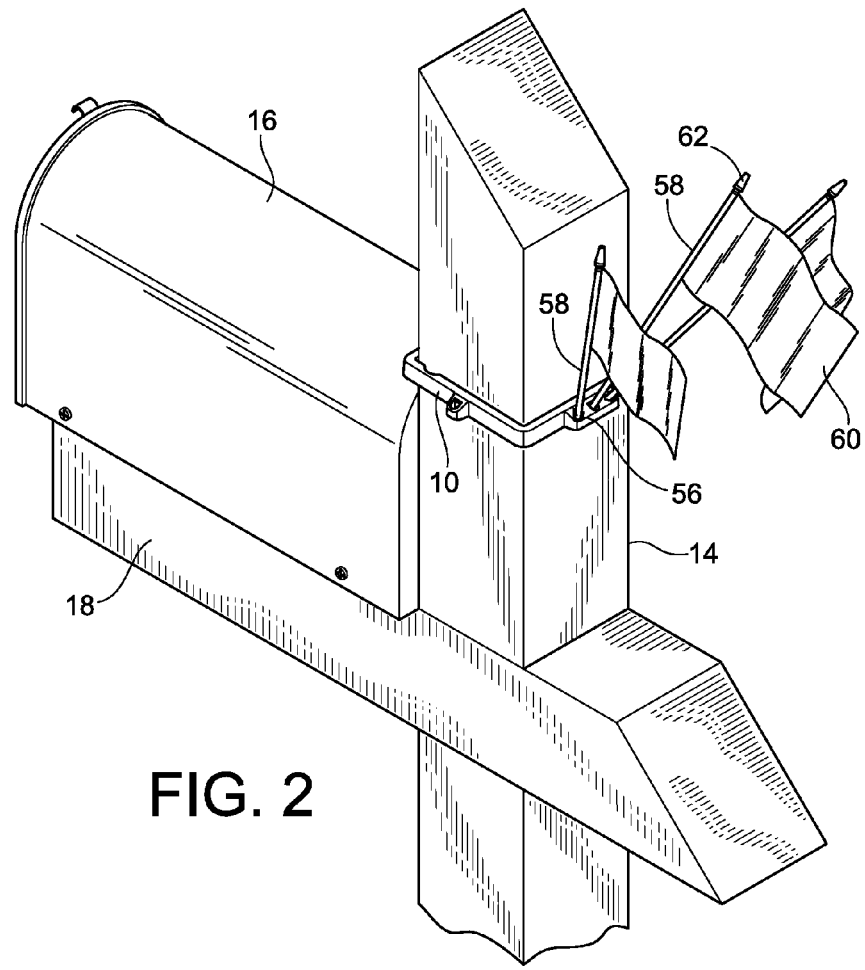
FIG. 2 is a perspective of the flag holder of FIG. 1 mounted on a square post.
Figure 3:
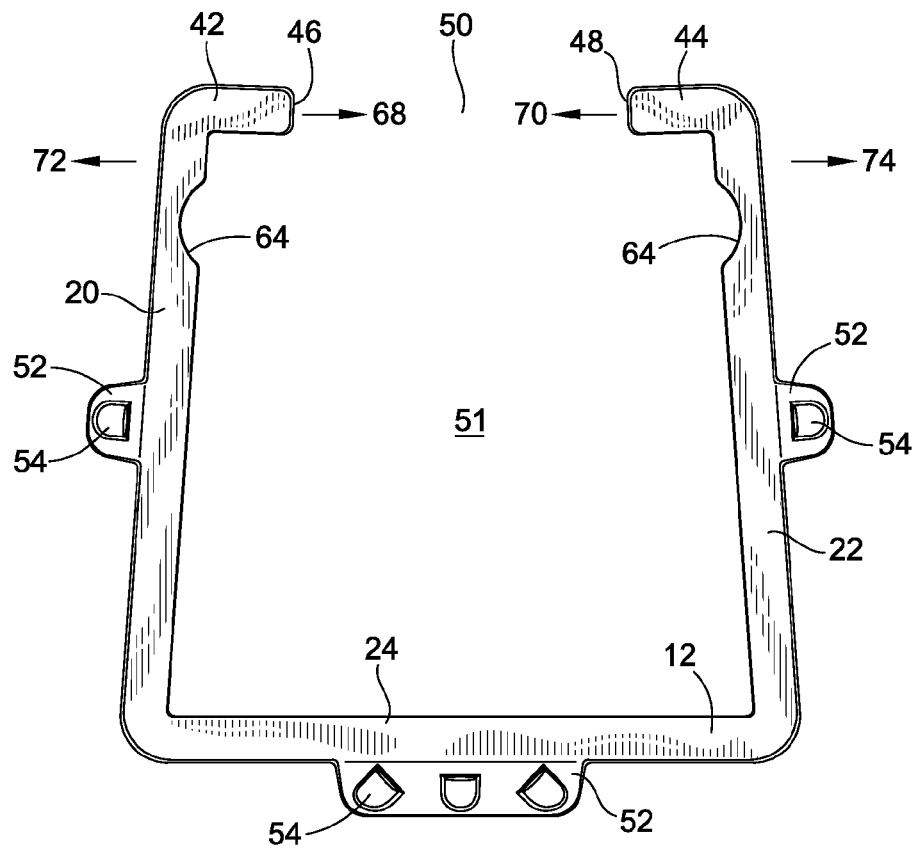
FIG. 3 is a top plan view of the flag holder of FIG. 1.

Referring now to FIGS. 1-3, the present invention is directed to a flag holder 10 comprising a collar 12 designed to support the flag holder 10 to a post 14, as illustrated in FIG. 2. As used in this disclosure, the term "post" incorporates a variety of objects to which the flag holder can be attached, including but not limited to square, round or rectangular posts or poles of any size or dimension. For purposes of the present disclosure, the term "post" will be exemplified by a 4×4 square post. Such a post 14 is typically used to support a mailbox 16 resting on a support 18, as illustrated in FIG. 2. Such posts 14 are also used for fences, gates, porch railings and the like. The collar 12 may be manufactured with a number of materials such polyresin, wood, plastic, polycarbonate, metals and other similarly situated rigid types of materials.

The collar 12 is a generally three-sided device which includes parallel side arms 20, 22 connected to a center arm 24 at intersection points 26, 28. The collar 12 is further defined by a first top surface 30, a second lower surface 32, a third outer surface 34, and a fourth inner surface 36. Situated at the distal ends 38, 40 of the side arms 20, 22 are a pair of gripping ears 42, 44 having ends 46, 48 which extend to an opening 50 of a central cavity 51 surrounded by the collar 12.

The flag holder 10 is further provided with one or more dowel channel forms 52, essentially shelves placed at various locations along the outer surface 34 of the side arms 20, 22 and the center arm 24 and extending therefrom. Each dowel channel form 52 includes at least one dowel channel 54. As illustrated in the dowel channel form 52 on the center arm 24, there may be a plurality of dowel channels 54 on the dowel channel form 52. The dowel channel 54 is typically a cylindrical channel bored at roughly a 45° angle with respect to the outer surface 34 of the flag holder 10. The dowel channel 54 is typically bored to a diameter of between about ¼"-¾" to accommodate the proximal end 56 of a dowel 58 having a similar diameter. In this manner, the proximal end 56 of the dowel 58 having a flag 60 or the like at its distal end 62 can be slidably placed within the dowel channel 54 to set the dowel 58 at an angle, as illustrated in FIG. 2. The dowel channels 54 may be tapered to accommodate varying dimensions in dowel sizes.

The flag holder 10 may also include finger grips 64, which are indentations in the inner surface 36 of the side arms 20, 22 near the intersection points 38, 40, to assist in removing the flag holder 10 from a post 14.

Figure 4:
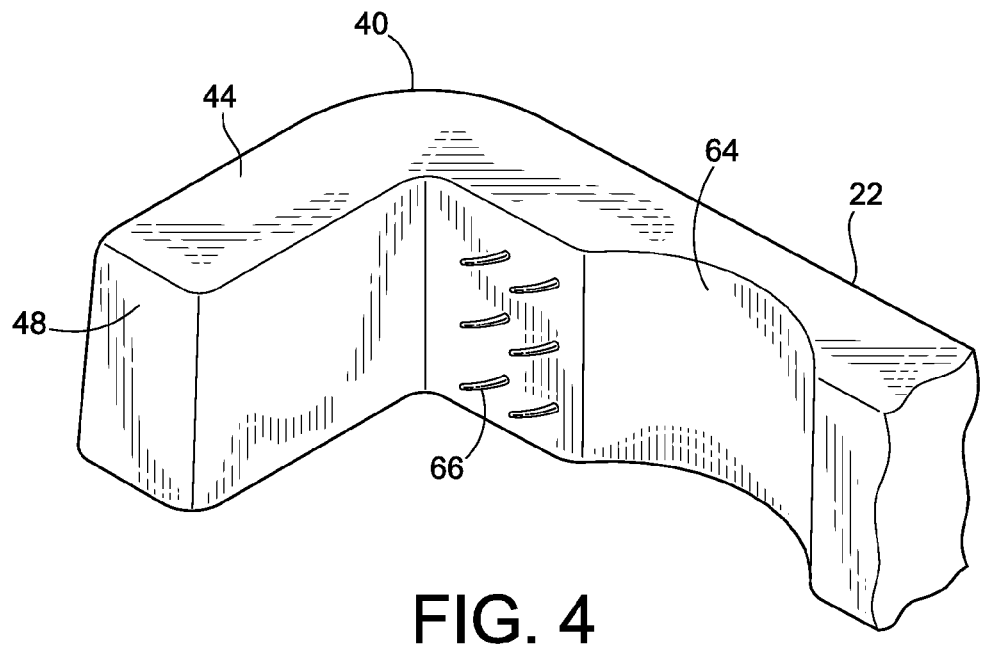
FIG. 4 is a partial perspective view of a second embodiment of a flag holder illustrating ridges or teeth and a thumb grip.

As illustrated in FIG. 4, the side arms 20, 22 may also include ridges or teeth 66, in the form of wire and metal brads which are molded on the inner surface 36 of the side arms 20, 22 for the purpose of adding an additional gripping action onto the post 14. When applied, the teeth 66 penetrate the post 14 to further secure the device 10.

Figure 5:
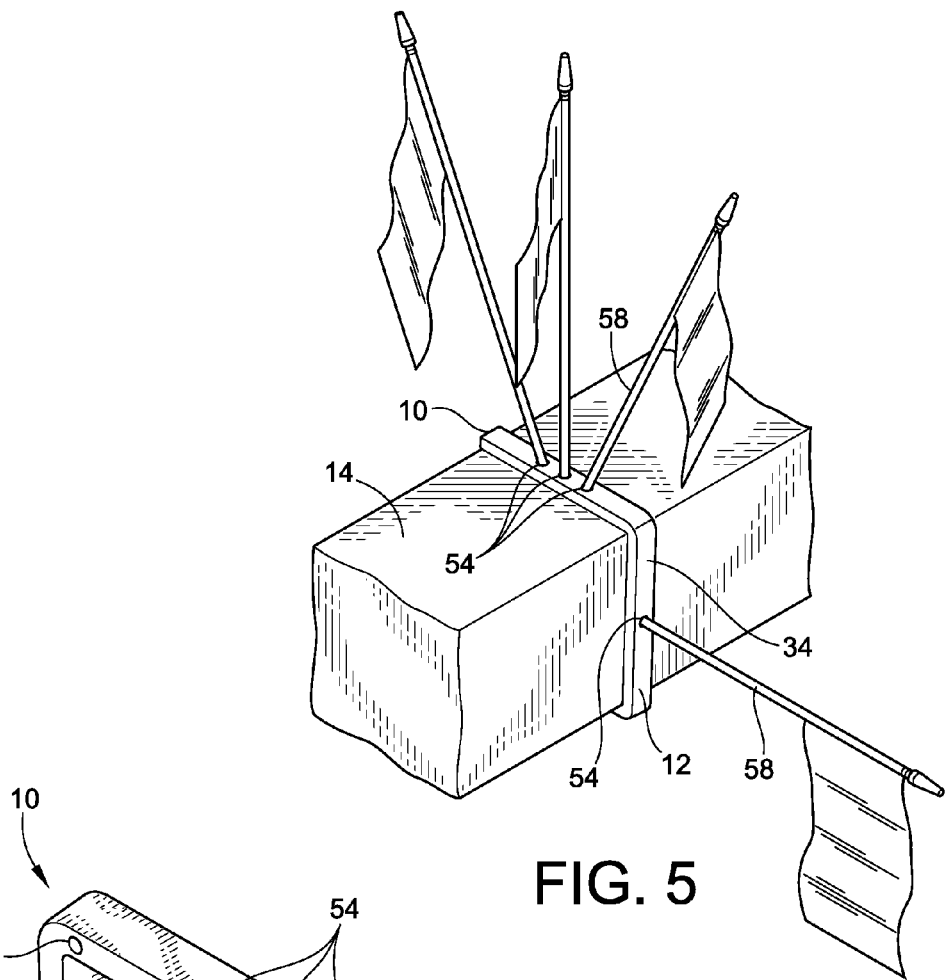
FIG. 5 is a perspective view illustrating a horizontally mounted flag holder on a mailbox.

As illustrated in FIG. 3, the side arms 20, 22 of collar 12 preferably include a memory-enhanced inward angle, represented by arrows 68, 70 to create a friction fit when the flag holder 10 is placed on a post 14 in the manner illustrated in FIGS. 2 and 5. This creates a friction-fit gripping action which causes the flag holder 10 to attach to the post 14 in a releasable yet secure manner, such that it will not be inadvertently removed from the post 14 or slip along the length of the post 14.

To attach the flag holder 10 to the post 14, one can grip the side arms 20, 22 of the collar 12 at the finger grip area 64 and urge the side arms 20, 22 in an outward direction, i.e., in the direction of arrows 72, 74, as illustrated in FIG. 3, such that the ends 46, 48 of the gripping ears 42, 44 create an opening 50 greater than the length of one side of the post 14. The collar 12 is then wrapped around the post 14 and the side arms 20, 22 are released causing an inward force to frictionally attach to the post 14. The gripping ears 42 and 44 provide a further gripping action on the post 14.

FIG. 5 illustrates an alternative embodiment of the flag holder 10 in which the dowel channels 54 are bored directly into the outer surface 34 of the collar 12 such that the dowels 58 extend from the outer surface 34 at about a 90° angle. It is within the scope of the present invention to have multiple dowel channels 54 positioned on the outer surface 34 of the side arms 20, 22 and the center arm 24.

Figure 6:
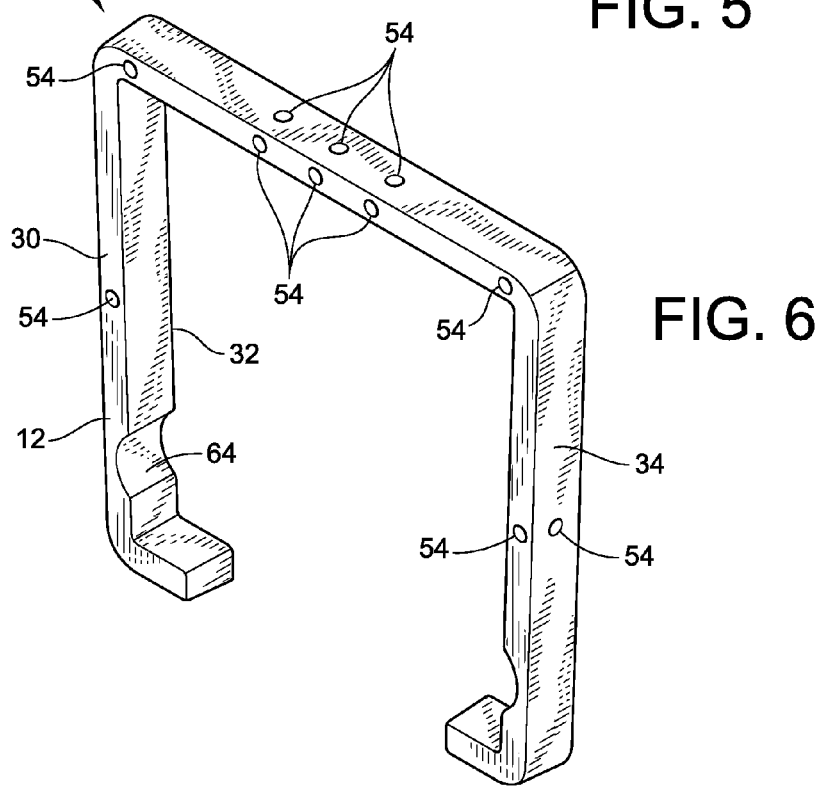
FIG. 6 is a perspective view illustrating a third embodiment of the flag holder of the present invention.

FIG. 6 illustrates yet another embodiment of the invention wherein dowel channels 54 can be placed on the first top surface 30, the second lower surface 32 (not illustrated), and the third outer surface 34 of the flag holder 10. In this manner, the flag holder can be used with both a vertically and a horizontally placed post 14. While not illustrated, it is within the scope of this embodiment to include a dowel channel form 52 for the dowel channels 54 as illustrated in FIG. 1.

The three-sided collar 12 allows for a placement anywhere on the post 14 as opposed to a solid/continuous collar which would require slipping the collar over an opened end, which would create an issue if the ends include a mailbox or a finial. It is within the scope of the present invention to increase the size and strength of the collar 12 to hold larger dowels 58 for larger flags 60, bird feeders and planters. Further, the collar 12 can have a variety of shapes in order to accommodate a post 14 of any configuration, such as a round post, a triangular post, or posts with more than 4 sides. In addition the side arms 20, 22 can be configured in different lengths or as an expandable arm length to accommodate posts 14 which may be rectangular in shape.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A mounting bracket adapted to be secured to a post, the mounting bracket comprising a three-sided collar adapted to hold at least one dowel, the three-sided collar comprising:

a. a center arm having a first and second end, and two substantially parallel side arms having first and second ends wherein the side arms define a memory-enhanced inward angle in a default position, wherein the first ends of the side arms are connected to the first and second ends of the center arm in substantially perpendicular format to form a shaped band for encircling a post;

b. a first top surface, a second lower surface, a third outer surface and a fourth inner surface;

c. a pair of gripping ears extending inwardly from the second ends of the side arms, wherein the center arm, side arms and gripping ears extend around a central cavity and wherein the gripping ears comprise gripping ear ends extending to an opening therebetween, wherein a distance between the gripping ear ends in the default position is less than a distance between the first ends of the two side arms, and wherein the side arms are capable of being urged in an outward direction to increase the distance between the gripping ear ends to be greater than the distance between the first ends of the two side arms; and d. at least one dowel channel form on the third outer surface of the collar, wherein the dowel channel form includes at least one dowel channel for receiving a dowel, wherein the dowel channel is bored at a 45° angle with respect to the third outer surface of the collar.

2. The mounting bracket of claim 1 comprising a plurality of dowel channel forms on the third outer surface of the collar.

3. The mounting bracket of claim 1 wherein the dowel channel form includes a plurality of dowel channels for receiving a dowel.

4. The mounting bracket of claim 1 wherein the dowel channel is tapered to receive dowels of varying dimensions.

5. The mounting bracket of claim 1 wherein the dowel includes a flag attached thereon.

6. The mounting bracket of claim 1 wherein the side arms further include gripping ridges positioned on the fourth inner surface of the collar.

7. The mounting bracket of claim 1 further comprising at least one dowel channel bored into the third outer surface of the collar.

8. The mounting bracket of claim 7 further comprising at least one dowel channel bored into the first top surface of the collar.

9. A mounting bracket adapted to be secured to a post, the mounting bracket comprising a three-sided collar adapted to hold at least one dowel, the collar comprising:

a. a center arm having a first and second end, and two substantially parallel side arms having first and second ends, wherein the side arms define a memory-enhanced inward angle in a default position to create a friction fit on a post, wherein the first ends of the side arms are connected to the first and second ends of the center arm in substantially perpendicular format to form a shaped band for encircling a post, and wherein an indentation is positioned on a fourth inner surface of each of the side arms to assist in urging the side arms in an outward direction;

b. a first top surface, a second lower surface, a third outer surface and a fourth inner surface;

c. a pair of gripping ears extending inwardly from the second ends of the side arms, wherein the center arm, side arms and gripping ears extend around a central cavity and wherein the gripping ears comprise gripping ear ends extending to an opening therebetween, wherein a distance between the gripping ear ends in the default position is less than a distance between the first ends of the two side arms, and wherein the side arms are capable of being urged in an outward direction to increase the distance between the gripping ear ends to be greater than the distance between the first ends of the two side arms; and d. at least one dowel channel form on the third outer surface of the collar, wherein the dowel channel form includes at least one dowel channel for receiving a dowel, wherein the dowel channel is bored at a 45° angle with respect to the third outer surface of the collar.

10. The mounting bracket of claim 9 comprising a plurality of dowel channel forms on the third outer surface of the collar.

11. The mounting bracket of claim 9 wherein the dowel channel form includes a plurality of dowel channels for receiving a dowel.

12. The mounting bracket of claim 9 wherein the dowel channel is tapered to receive dowels of varying dimensions.

13. The mounting bracket of claim 9 wherein the dowel includes a flag attached thereon.

14. The mounting bracket of claim 9 wherein the side arms further include gripping ridges positioned on the fourth inner surface of the collar.

15. The mounting bracket of claim 9 further comprising at least one dowel channel bored into the third outer surface of the collar.

16. The mounting bracket of claim 15 further comprising at least one dowel channel bored into the first top surface of the collar.

* * * * *